United States Patent [19]

Hastings et al.

[11] Patent Number: 5,481,810
[45] Date of Patent: Jan. 9, 1996

[54] COMBINATION TAPE MEASURE AND STRAIGHT EDGE APPARATUS

[76] Inventors: Michael R. Hastings, 25 Dole Rd., Gill, Mass. 01376; John E. Remillard, Box 271, Bernardston, Mass. 01337

[21] Appl. No.: 357,592

[22] Filed: Dec. 16, 1994

[51] Int. Cl.⁶ .................... B43L 7/027; G01B 3/10
[52] U.S. Cl. .................... 33/484; 33/760; 33/768
[58] Field of Search ............... 33/767, 761, 760, 33/770, 768, 755, 474, 480, 481, 484, 485

[56] References Cited

U.S. PATENT DOCUMENTS

| | | | |
|---|---|---|---|
| 530,111 | 12/1894 | Krebs | 33/480 |
| 642,888 | 2/1900 | Van Vliet | 33/761 |
| 2,563,674 | 8/1951 | Coots | 33/761 |
| 2,571,569 | 10/1951 | Greenwood | 33/767 |
| 3,390,461 | 7/1968 | Anderson | 33/761 |
| 3,651,574 | 3/1972 | Burkhart | 33/761 |
| 3,823,481 | 7/1974 | Chapin | 33/761 |
| 4,227,314 | 10/1980 | Schliep | 33/480 |
| 4,228,594 | 10/1980 | Shlager . | |
| 4,438,538 | 3/1984 | Larsen . | |
| 4,642,898 | 2/1987 | Miller | 33/768 |
| 4,700,489 | 10/1987 | Vasile . | |
| 4,773,163 | 9/1988 | Wolford, Jr. | 33/474 |
| 4,811,489 | 3/1989 | Walker . | |
| 4,835,870 | 6/1989 | Rauch et al. | 33/760 |
| 4,965,944 | 10/1990 | Kuze et al. . | |

FOREIGN PATENT DOCUMENTS

| | | | |
|---|---|---|---|
| 825903 | 12/1951 | Germany | 33/761 |
| 91/17410 | 11/1991 | WIPO | 33/761 |

Primary Examiner—Thomas B. Will

[57] ABSTRACT

A combination tape measure and straight edge apparatus includes a first straight edge segment which includes an outer edge and an inner edge and which has a predetermined thickness. A tape measure assembly includes a bottom side, and a hinge assembly is connected between the bottom side of the tape measure assembly and the inner edge of the first straight edge segment. The hinge assembly is adapted to permit the tape measure assembly to be rotated with respect to the first straight edge segment from a storage orientation to either a first in-use orientation or a second in-use orientation or from an in-use orientation to a storage orientation. The first straight edge segment includes a first end and a second end. A guide member is connected to the outer edge of the first straight edge segment. The guide member is connected to the first straight edge segment at a right angle. A second straight edge segment may be connected to the first end of the first straight edge segment. The second straight edge segment is oriented perpendicular to the first straight edge segment. A third straight edge segment may be connected between the first straight edge segment and the second straight edge segment. The first straight edge segment, the second straight edge segment, and the third straight edge segment form a unified, integrated right triangle.

14 Claims, 3 Drawing Sheets

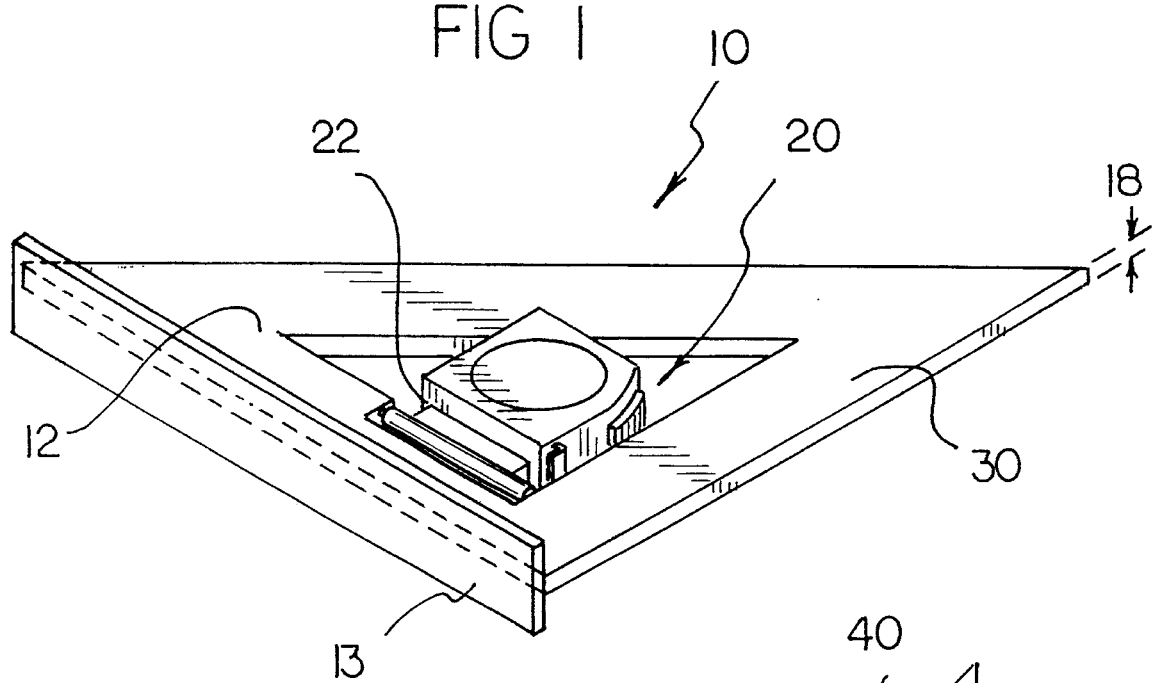
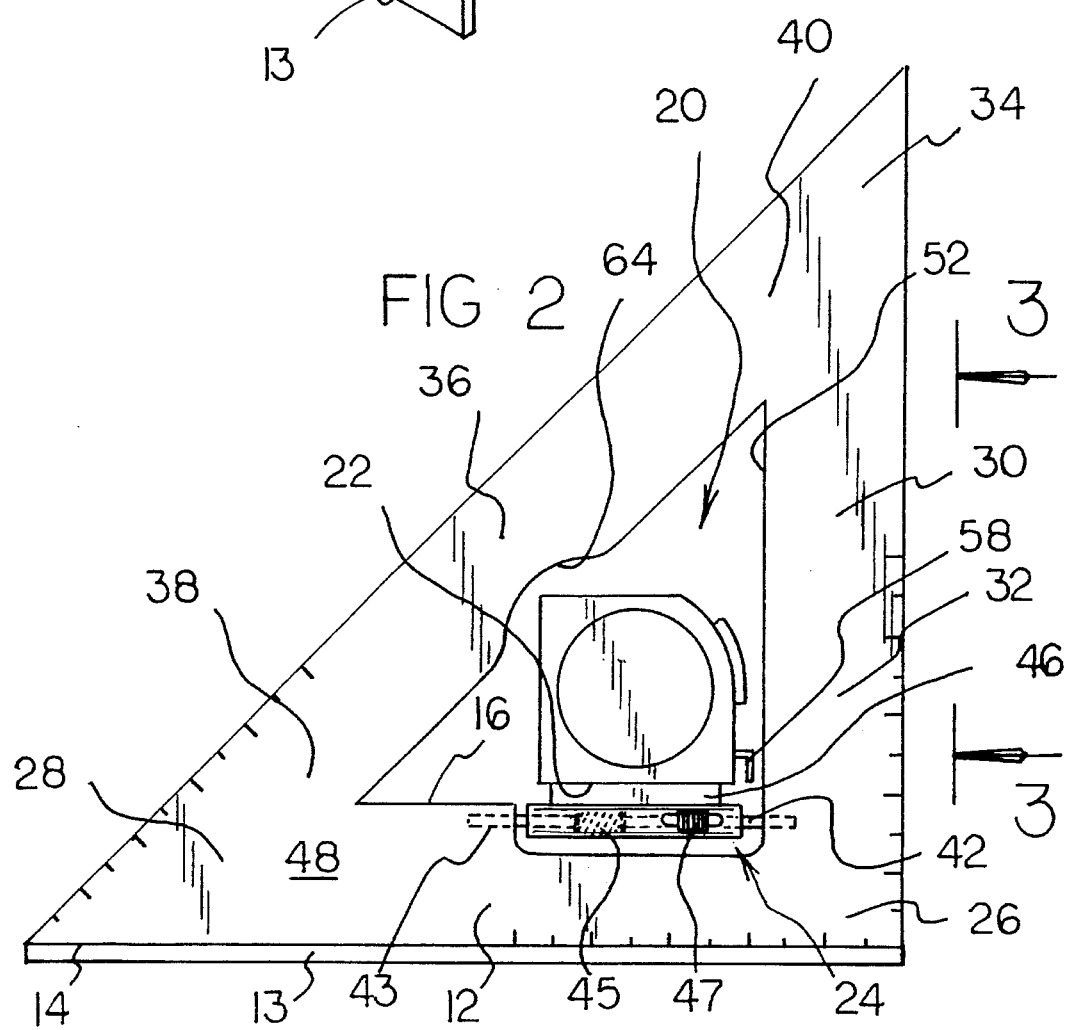

5,481,810

COMBINATION TAPE MEASURE AND STRAIGHT EDGE APPARATUS

BACKGROUND OF THE INVENTION

1. Field of the Invention

The present invention relates generally to measuring and drawing instruments and, more particularly, to tape measures and to triangles.

2. Description of the Prior Art

Tape measures are compact and portable devices used for measuring lengths. Triangles are substantially flat, planar devices used for measuring and drawing straight lines. Though compact, tape measures have a width that is at least as wide as the tape in the tape measure. Actually, the tape measures are wider than the tape to account for the tape measure housing. On the other hand, a triangle has a much smaller width than the tape measure. Consequently, in the prior art, the combining of a tape measure with a triangle is incompatible. However, it would be desirable is a compatible combination of a tape measure and a triangle could be provided.

Throughout the years, a number of innovations have been developed relating to combinations of tape measures with other devices, and the following U.S. patents are representative of some of those innovations: U.S. Pat. Nos. 4,228,594; 4,438,538; 4,76b,489; 4,81i,489; and 4,965,944. More specifically, U.S. Pat. No. 4,228,594 discloses a tape measure combined with a layout tool for locating holes on structural steel. U.S. Pat. No. 4,438,538 discloses a tape measure combined with a chalk line reel. U.S. Pat. No. 4,700,489 discloses a tape measure combined with levels, a stud locator, and a marker. U.S. Pat. No. 4,811,489 discloses a tape measuring strip that bears indicia adapted to aid a pipe fitter in his work. U.S. Pat. No. 4,965,944 discloses a tape measure that has a case which permits marking of lines perpendicular to the edge of a workpiece.

In all of the U.S. patents discussed above, the width of the tape measure and its housing would prevent the use of a tape measure with a substantially flat triangle.

Still other features would be desirable in a combination tape measure and straight edge apparatus. A triangle often has one set of measurement indicia scribed on one side of the triangle and another set of measurement indicia served on the other side of the triangle. Consequently, it would be desirable for a combination tape measure and straight edge apparatus to permit the measurement indicia of both sides of a triangle to be used with the tape measure being present. In conjunction with this desired feature, it would also be desirable to be able to readily switch from using one side of the triangle to the other side of the triangle.

Because a combination tape measure and straight edge apparatus should enable both the tape measure and a triangle to be used without interference of the other, it would be desired for a combination tape measure and straight edge apparatus to permit the tape measure to be used without interference from the triangle.

Thus, while the foregoing body of prior art indicates it to be well known to use tape measures in combination with other devices, the prior art described above does not teach or suggest a combination tape measure and straight edge apparatus which has the following combination of desirable features: (1) provides a compatible combination of a tape measure and a triangle; (2) permits the measurement indicia of both sides of the triangle to be used with the tape measure being present; (3) permits the tape measure to be readily switched from one side of the triangle to the other side of the triangle; and (4) permits the tape measure to be used without interference from the triangle. The foregoing desired characteristics are provided by the unique combination tape measure and straight edge apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a combination tape measure and straight edge apparatus which includes a first straight edge segment which includes an outer edge and an inner edge and which has a predetermined thickness. A tape measure assembly includes a bottom side, and a hinge assembly is connected between the bottom side of the tape measure assembly and the inner edge of the first straight edge segment. The hinge assembly is adapted to permit the tape measure assembly to be rotated with respect to the first straight edge segment from a storage orientation to either a first in-use orientation or a second in-use orientation or from an in-use orientation to a storage orientation. The first straight edge segment includes a first end and a second end. A guide member is connected to the outer edge of the first straight edge segment. The guide member is connected to the first straight edge segment at a right angle.

A second straight edge segment may be connected to the first end of the first straight edge segment. The second straight edge segment is oriented perpendicular to the first straight edge segment. The second straight edge segment includes a first end and a second end. The first end of the second straight edge segment is connected to the first end of the first straight edge segment.

A third straight edge segment may be connected between the first straight edge segment and the second straight edge segment. The third straight edge segment includes a first end and a second end. The first end of the third straight edge segment is connected to the second end of the first straight edge segment, and the second end of the third straight edge segment is connected to the second end of the second straight edge segment. The first straight edge segment, the second straight edge segment, and the third straight edge segment form a triangle. Preferably, the first straight edge segment, the second straight edge segment, and the third straight edge segment are formed as a unified, integrated right triangle.

The hinge assembly includes a hinge pin supported at each end by portions of the first straight edge segment. A sleeve member jackets the hinge pin, and a riser member is connected to the sleeve member.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved combination tape measure and straight edge apparatus which has all of the advantages of the prior art and none of the disadvantages.

It is another object of the present invention to provide a new and improved combination tape measure and straight edge apparatus which may be easily and efficiently manufactured and marketed.

It is a further object of the present invention to provide a new and improved combination tape measure and straight edge apparatus which is of durable and reliable construction.

An even further object of the present invention is to provide a new and improved combination tape measure and straight edge apparatus which is susceptible of a low cost of manufacture with regard to both materials and labor, and which accordingly is then susceptible of low prices of sale to the consuming public, thereby making such combination tape measure and straight edge apparatus available to the buying public.

Still yet a further object of the present invention is to provide a new and improved combination tape measure and straight edge apparatus which provides a compatible combination of a tape measure and a triangle.

Still another object of the present invention is to provide a new and improved combination tape measure and straight edge apparatus that permits the measurement indicia of both sides of a triangle to be used with the tape measure being present.

Yet another object of the present invention is to provide a new and improved combination tape measure and straight edge apparatus which permits the tape measure to be readily switched from one side of a triangle to the other side of the triangle.

Even another object of the present invention is to provide a new and improved combination tape measure and straight edge apparatus that permits the tape measure to be used without interference from a triangle.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the combination tape measure and straight edge apparatus of the invention in a storage mode lying on a flat horizontal surface.

FIG. 2 is an enlarged front view of the embodiment of the invention shown in FIG. 1 standing on an edge.

DESCRIPTION OF THE PREFERRED EMBODIMENT

Figure 3:
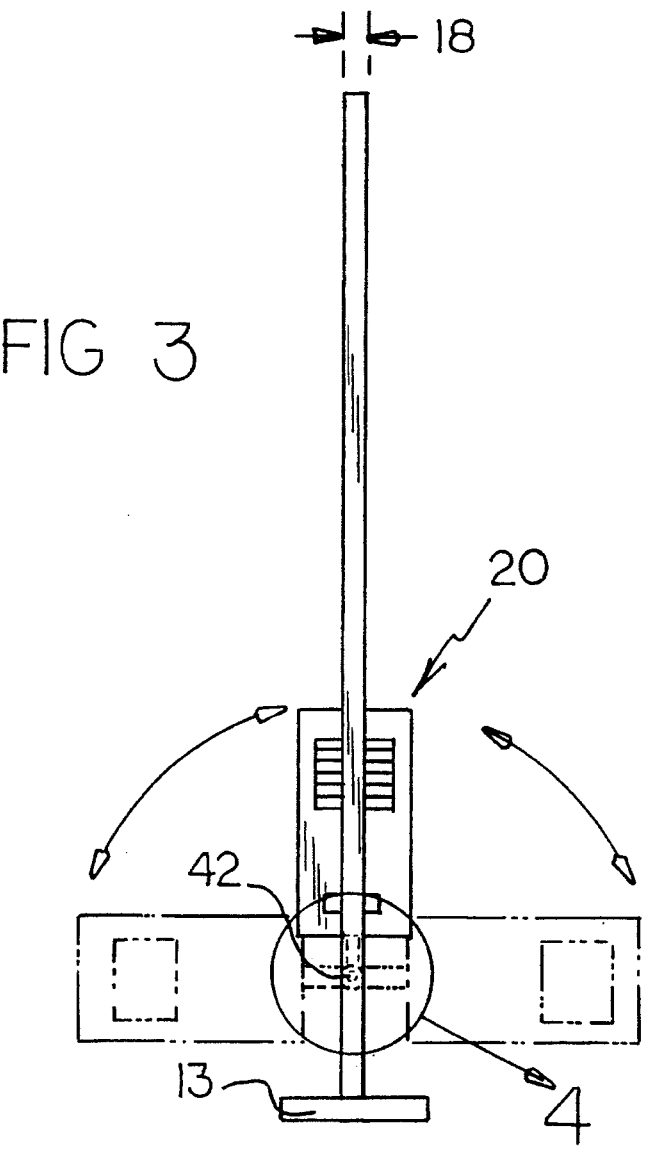
FIG. 3 is a side view of the embodiment of the invention shown in FIG. 2 showing a first in-use orientation of the tape measure and a second in-use orientation of the tape measure when moved from the storage mode to an in-use orientation.
Figure 4:
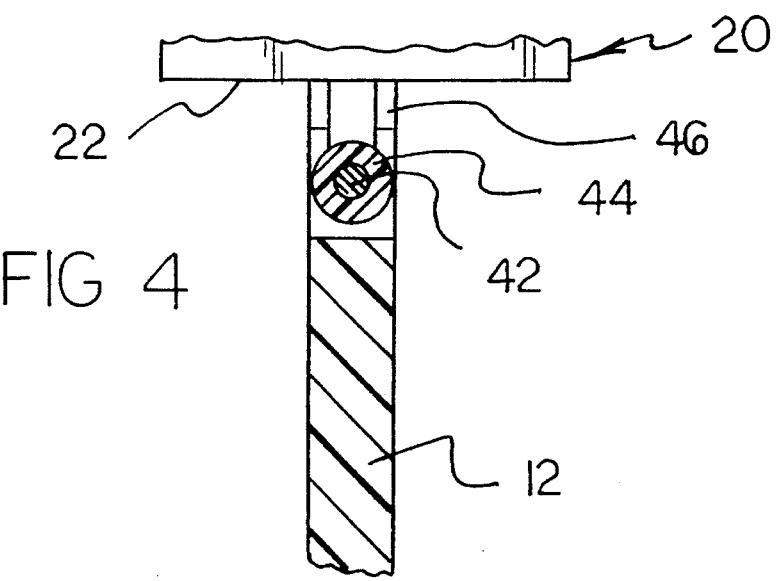
FIG. 4 is an enlarged cross-sectional view of the portion of the embodiment of the invention shown in FIG. 3 taken in the circled area 4 of FIG. 3.

With reference to the drawings, a new and improved combination tape measure and straight edge apparatus embodying the principles and concepts of the present invention will be described.

Turning to FIGS. 1–6, there is shown an exemplary embodiment of the combination tape measure and straight edge apparatus of the invention generally designated by reference numeral 10. In its preferred form, combination tape measure and straight edge apparatus 10 includes a first straight edge segment 12 which includes an outer edge 14 and an inner edge 16 and which has a predetermined thickness 18. A tape measure assembly 20 includes a bottom side 22, and a hinge assembly 24 is connected between the bottom side 22 of the tape measure assembly 20 and the inner edge 16 of the first straight edge segment 12. The hinge assembly 24 is adapted to permit the tape measure assembly 20 to be rotated with respect to the first straight edge segment 12 from a storage orientation to either a first in-use orientation or a second in-use orientation or from an in-use orientation to a storage orientation. The first straight edge segment 12 includes a first end 26 and a second end 28. A guide member 13 is connected to the outer edge 14 of the first straight edge segment 12. The guide member 13 is connected to the first straight edge segment 12 at a right angle.

A second straight edge segment 30 is connected to the first end 26 of the first straight edge segment 12. The second straight edge segment 30 is oriented perpendicular to the first straight edge segment 12. The first straight edge segment 12 and the second straight edge segment 30 can be formed as a unified, integrated square structure. A square is a common drawing instrument that includes two straight edge segments perpendicular to each other. The second straight edge segment 30 includes a first end 32 and a second end 34. The first end 32 of the second straight edge segment 30 is connected to the first end 26 of the first straight edge segment 12.

A third straight edge segment 36 is connected between the first straight edge segment 12 and the second straight edge segment 30. The third straight edge segment 36 includes a first end 38 and a second end 40. The first end 38 of the third straight edge segment 36 is connected to the second end 28 of the first straight edge segment 12, and the second end 40 of the third straight edge segment 36 is connected to the second end 34 of the second straight edge segment 30. The first straight edge segment 12, the second straight edge segment 30, and the third straight edge segment 36 form a triangle. Preferably, the first straight edge segment 12, the second straight edge segment 30, and the third straight edge segment 36 are formed as a unified, integrated right triangle.

The hinge assembly 24 includes a hinge pin 42 supported at each end by portions of the first straight edge segment 12. A sleeve member 44 jackets the hinge pin 42, and a riser member 46 is connected to the sleeve member 44. More specifically, the hinge assembly 24 includes a fixed hinge pin 42 and a movable hinge pin 43. The movable hinge pin 43 is connected to a spring 45, and a thumb-operated slide control button 47 is connected to the spring 45. When a person desires to remove the tape measure assembly 20 from the first straight edge segment 12, the person slides the control button 47 toward the fixed hinge pin 42, and the movable hinge pin 43 is freed up from connection with the first straight edge segment 12. Then, the fixed hinge pin 42 can also be freed up from the first straight edge segment 12 by moving the tape measure assembly 20 and the fixed hinge pin 42 away from the first straight edge segment 12. Then, the tape measure assembly 20 can be removed from the first straight edge segment 12.

The bottom side 22 of the tape measure assembly 20 is connected to the riser member 46. The sleeve member 44 is adapted to pivot around the hinge pin 42 when moving the tape measure assembly 20 to in-use orientations from a non-use orientation and vice versa. The riser member 46 assures that the tape measure assembly 20 is elevated sufficiently above the upper surface 48 of the first straight edge segment 12 such that the tape portion 50 of the tape measure assembly 20 can be extended from and retracted into the tape measure assembly 20 without interfering with either the second straight edge segment 30 or the third straight edge segment 36.

When a first straight edge segment 12, a second straight edge segment 30, and a third straight edge segment 36 are employed to form a triangle, then sufficient interior space 52 must be provided to permit the tape measure assembly 20 to be stored and to permit the tape measure assembly 20 to be to and from inuse orientations. An indentation 64 is provided on the third straight edge segment 36 to provide a clearance for an upper corner of the tape measure assembly 20 when the tape measure assembly 20 is in a non-use orientation.

As shown in FIG. 3, the tape measure assembly 20 and the attached riser member 46 and sleeve member 44 can be rotated around the hinge pin 42 in either a clockwise or counterclockwise direction to move the tape measure assembly 20 to and from in-use and non-use orientations.

Figure 5:
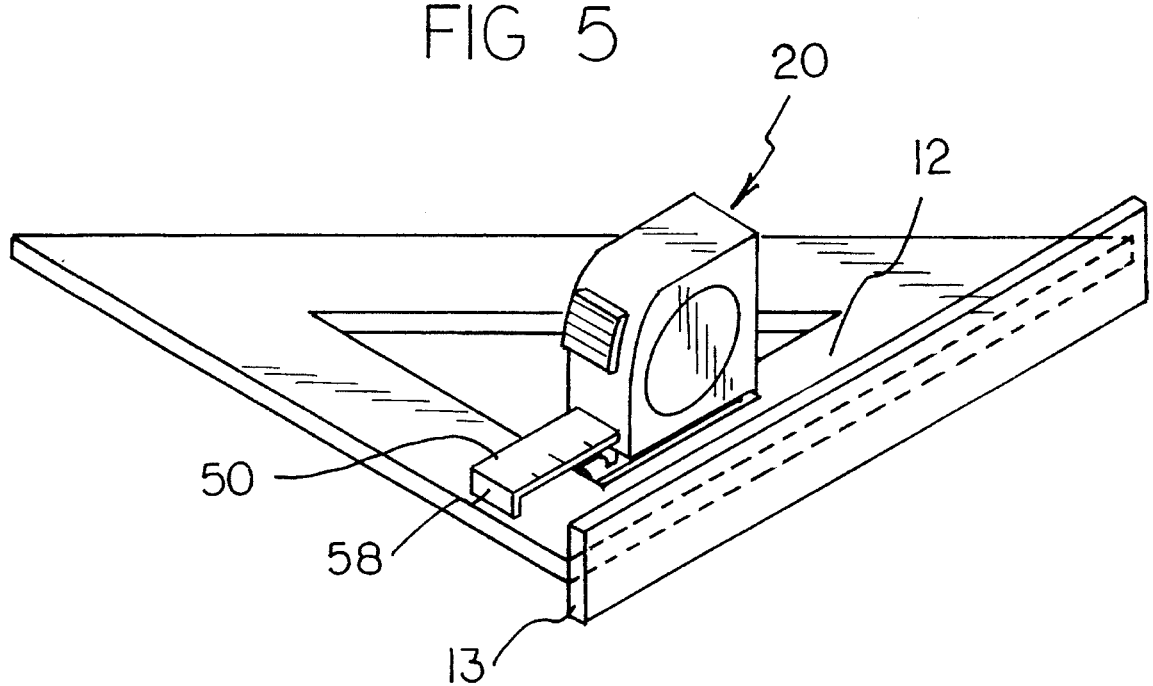
FIG. 5 is a perspective view of the embodiment of the invention shown in FIG. 1 with the tape measure in a first in-use orientation.
Figure 6:
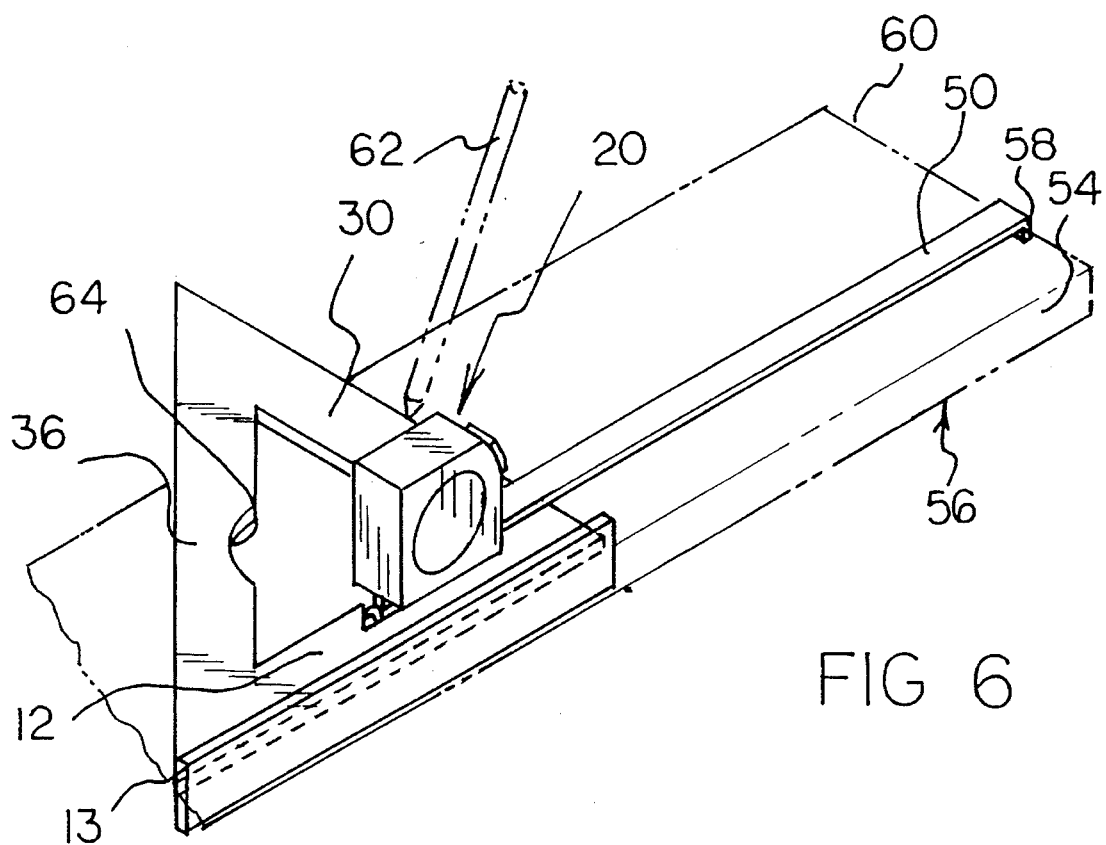
FIG. 6 is a perspective view of the embodiment of the invention shown in FIG. 5 in use on a board with the tape measure in use and a triangle in use for drawing a line with a writing implement.

Specific reference is made to FIGS. 5 and 6 for illustrations of the combination tape measure and straight edge apparatus 10 of the invention in use. In FIG. 5, the tape measure assembly 20 is in an in-use orientation, and the tape portion 50 of the tape measure assembly 20 has been pulled out to a small degree. In FIG. 6, the guide member 13 has been placed against an edge 54 of a board 56. The tape measure assembly 20 is in an in-use orientation, and the tape portion 50 of the tape measure assembly 20 has been extended so that a vertical tab 58 is hooked over another edge 60 of the board 56. In addition, a writing implement 62 is held by a hand (not shown) and is used to draw a straight line on the board 56 by urging a side portion of the point of the writing implement 62 against the outside edge of the second straight edge segment 30 as the side portion of the writing implement 62 is drawn along the second straight edge segment 30 and as the bottom portion of the point contacts the upper surface of the board 56.

Another feature that can be provided with the invention is a provision for locking the tape in a non-use position.

The components of the combination tape measure and straight edge apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved combination tape measure and straight edge apparatus that is low in cost, relatively simple in design and operation, and which provides a compatible combination of a tape measure and a triangle. With the invention, a combination tape measure and straight edge apparatus is provided which permits the measurement indicia of both sides of a triangle to be used with the tape measure being present. With the invention, a combination tape measure and straight edge apparatus is provided which permits the tape measure to be readily switched from one side of a triangle to the other side of the triangle. With the invention, a combination tape measure and straight edge apparatus is provided which permits the tape measure to be used without interference from a triangle.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A combination tape measure and straight edge apparatus, comprising:

a first straight edge segment which includes an outer edge and an inner edge and which has a predetermined thickness, a tape measure assembly which includes a bottom side, and a hinge assembly connected between said bottom side of said tape measure assembly and said inner edge of said first straight edge segment, wherein said hinge assembly is adapted to permit said tape measure assembly to be rotated with respect to said first straight edge segment from a storage orientation to either a first in-use orientation or a second in-use orientation or from one of said in-use orientations to said storage orientation, wherein said hinge assembly includes, a sleeve member, a fixed hinge pin connected to one end of said sleeve member and adapted to be in engagement with said inner edge of said first straight edge segment, a movable hinge pin in sliding connection with an opposite end of said sleeve member and adapted to be in engagement with said inner edge of said first straight edge segment, a spring connected to said movable hinge pin, and a thumb-operated slide control button connected to said spring, such that, in order to remove said tape measure assembly from said first straight edge segment, a person slides said control button toward said fixed hinge pin, such that said movable hinge pin is freed up from connection with said inner edge of said first straight edge segment, and such that the person can move said fixed hinge pin out of contact with said inner edge of said first straight edge segment, whereby said tape measure assembly can be removed from the first straight edge segment.

2. The apparatus of claim 1 wherein said first straight edge segment includes a first end and a second end.

3. The apparatus of claim 1, further including:

a guide member connected to said outer edge of said first straight edge segment.

4. The apparatus of claim 3 wherein said guide member is connected to said first straight edge segment at a right angle.

5. The apparatus of claim 2, further including:

a second straight edge segment connected to said first end of said first straight edge segment.

6. The apparatus of claim 5 wherein said second straight edge segment is oriented perpendicular to said first straight edge segment.

7. The apparatus of claim 5 wherein said second straight edge segment includes a first end and a second end.

8. The apparatus of claim 7 wherein said first end of said second straight edge segment is connected to said first end of said first straight edge segment.

9. The apparatus of claim 7, further including:

a third straight edge segment connected between said first straight edge segment and said second straight edge segment.

10. The apparatus of claim 9 wherein said third straight edge segment includes a first end and a second end.

11. The apparatus of claim 10 wherein:

said first end of said third straight edge segment is connected to said second end of said first straight edge segment, and said second end of said third straight edge segment is connected to said second end of said second straight edge segment.

12. The apparatus of claim 11 wherein said first straight edge segment, said second straight edge segment, and said third straight edge segment form a triangle.

13. The apparatus of claim 11 wherein said first straight edge segment, said second straight edge segment, and said third straight edge segment are formed as a unified, integrated right triangle.

14. The apparatus of claim 1 wherein said hinge assembly further includes:

a riser member connected to said sleeve member.

* * * * *